(12) United States Patent
Mallinowski

(10) Patent No.: US 10,889,979 B2
(45) Date of Patent: Jan. 12, 2021

(54) HABITATION BLOCK AND METHOD FOR PRODUCING THERMAL INSULATION

(71) Applicant: Werk eins GmbH, Wassenberg (DE)

(72) Inventor: Ivan Mallinowski, Wassenberg (DE)

(73) Assignee: WERK eins GmbH, Wassenberg (DE)

( * ) Notice: Subject to any disclaimer, the term of this patent is extended or adjusted under 35 U.S.C. 154(b) by 0 days.

(21) Appl. No.: 16/410,010

(22) Filed: May 13, 2019

(65) Prior Publication Data
US 2019/0330839 A1   Oct. 31, 2019

Related U.S. Application Data

(63) Continuation of application No. PCT/EP2017/001334, filed on Nov. 15, 2017.

(30) Foreign Application Priority Data

Nov. 15, 2016 (DE) .................... 20 2016 106 380 U
Jul. 26, 2017 (DE) ........................ 10 2017 116 939

(51) Int. Cl.
*E04B 1/76* (2006.01)
*E04B 1/99* (2006.01)
(Continued)

(52) U.S. Cl.
CPC ........ *E04B 1/34815* (2013.01); *E04B 1/7604* (2013.01); *E04B 1/99* (2013.01);
(Continued)

(58) Field of Classification Search
CPC ...... E04B 1/34815; E04B 1/7604; E04B 1/99; E04B 1/34336; E04B 2/723; E04B 2001/742; E04F 15/18
(Continued)

(56) References Cited

U.S. PATENT DOCUMENTS 3,563,845 A * 2/1971 Stevens .................... B29C 44/06
428/215
4,156,998 A * 6/1979 McClure .................... B32B 5/18
52/309.5

(Continued)

FOREIGN PATENT DOCUMENTS

AU    2013201852 A1    1/2014
DE    2221486    11/1972
(Continued)

*Primary Examiner* — Paola Agudelo
(74) *Attorney, Agent, or Firm* — Von Rohrscheidt Patents

(57) ABSTRACT

A habitation block including habitation levels that are arranged on top of each other, wherein at least one of the habitation levels includes adjacent habitation units including an outer shell formed from a cuboid container that includes a placement surface, a cover, up to two lateral walls and up to two face walls, a cuboid interior space which has an edge length of at least 2 m, a walkable base with step sound-proofing, a room ceiling, and room walls, wherein the room walls are dry walls with an intermediary space formed between the cover and the up to four lateral walls and between the room ceiling and the room walls, and a monolithic thermal insulation in the intermediary space, wherein the thermal insulation fills the intermediary space completely and is glued together with the room ceiling and with the room walls.

5 Claims, 2 Drawing Sheets

(51) Int. Cl.
*E04B 1/348* (2006.01)
*E04B 2/72* (2006.01)
*E04F 15/18* (2006.01)
*E04B 1/74* (2006.01)

(52) U.S. Cl.
CPC .............. *E04B 2/723* (2013.01); *E04F 15/18* (2013.01); *E04B 2001/34892* (2013.01); *E04B 2001/742* (2013.01)

(58) Field of Classification Search
USPC ...................................................... 220/592.2
See application file for complete search history.

(56) References Cited

U.S. PATENT DOCUMENTS

| | | | | |
|---|---|---|---|---|
| 4,399,645 | A * | 8/1983 | Murphy | E04B 1/7604 52/2.11 |
| 5,113,625 | A * | 5/1992 | Davis | E04B 1/34336 52/143 |
| 5,511,908 | A * | 4/1996 | Van Valkenburgh | B65F 1/1426 206/386 |
| 5,552,095 | A * | 9/1996 | Merser | B27G 11/00 156/285 |
| 5,733,582 | A | 3/1998 | Johnson | |
| 6,860,082 | B1 * | 3/2005 | Yamamoto | B62D 33/048 52/794.1 |
| 6,920,996 | B1 * | 7/2005 | Brassington | B65D 90/06 220/1.5 |
| 10,301,813 | B1 * | 5/2019 | Hawkins | E04B 1/34815 |
| 2004/0237439 | A1 * | 12/2004 | Powell | E04B 1/20 52/505 |
| 2008/0168741 | A1 * | 7/2008 | Gilgan | E04C 2/386 52/745.19 |
| 2009/0071088 | A1 * | 3/2009 | Viegas | B62D 33/048 52/406.1 |
| 2011/0024432 | A1 * | 2/2011 | Jorgensen | B65D 88/126 220/592.2 |
| 2014/0115991 | A1 * | 5/2014 | Sievers | E04B 1/10 52/309.4 |
| 2014/0318036 | A1 * | 10/2014 | Eom | F24S 25/10 52/79.1 |
| 2015/0048097 | A1 * | 2/2015 | Jeffries | B65D 90/06 220/592.25 |
| 2016/0069064 | A1 * | 3/2016 | Martin | E04H 1/005 52/79.7 |
| 2019/0145101 | A1 * | 5/2019 | Costanza | E04B 1/14 52/309.8 |

FOREIGN PATENT DOCUMENTS

| | | |
|---|---|---|
| DE | 3208302 A1 | 9/1982 |
| DE | 202008002754 U1 | 8/2008 |
| DE | 202016104722 U1 | 10/2016 |
| EP | 0367275 A1 | 5/1990 |
| GB | 2472761 A | 2/2011 |

* cited by examiner

HABITATION BLOCK AND METHOD FOR PRODUCING THERMAL INSULATION

RELATED APPLICATIONS

This application is a continuation of international application PCT/EP2017/001334 filed on Nov. 15, 2017 claiming priority from German patent applications DE 20 2016 106 380.9 filed on Nov. 15, 2016 and DE 10 2017 116 939.3 filed on Jul. 26, 2017, both of which are incorporated in their entirety by this reference.

FIELD OF THE INVENTION

The invention relates to a habitation block and to a method for producing a thermal insulation between a room wall of a cuboid interior space and an exterior wall that is parallel to the room wall.

BACKGROUND OF THE INVENTION

Sea containers also designated as ISO containers, in particular according to ISO 668, are standardized, cuboid, large containers made from steel that facilitate simple and quick loading, transporting and storing of goods.

Upcycling used sea containers into habitation units requires high quality insulation of the interior in order to provide a high level of habitation quality and on the other hand side in order to minimize energy consumption when used for habitation. In order to prevent thermal bridges caused by metal connections as well as caused by gaps, monolithic thermal insulations, thus thermal insulations that are made from one piece and that are joined without gaps, are being used that support the floor, the room ceiling, and the room walls.

DE 20 2008 002 754 U1 proposes a habitation block made from recycled ISO steel containers with a thermal insulation made from prefabricated insulation plates. In practical applications thermal bridges cannot be avoided between prefabricated insulation plates. Condensation water collects at in inside of the containers, in particular when the inside of the container forms an outer skin of the habitation block, wherein the condensation water causes bacterial growth and impairs the thermal insulation.

GB 2472761 A proposes to spray thermal insulation made from hard polyurethane foam onto an interior of the walls in a habitation unit made from a recycled ISO steel container, imbed support elements into the insulation and bolt the base, the room ceiling and the room walls to the support elements. The support elements embedded into the thermal insulation degrade the effectiveness of the thermal insulation in particular spots.

DE 2 221 486 A proposes a camping trailer superstructure with an inner shell from glass fiber-reinforced PE resin constructed on a core and constructing a mold around the inner shell and filling a cavity with PU foam providing thermal insulation and building an outer shell in turn from glass fiber-reinforced PE resin after removing the mold.

EP 0 367 275 A1, U.S. Pat. No. 6,920,996 B1 propose to fabricate sidewalls, roof and floor of an isolated container initially individually as a "sandwich" and then join it or arrange spacers between the inner shell and the outer shell.

U.S. Pat. No. 5,733,582 A furthermore proposes fabricating an insulated container by clamping the container and a prefabricated inner shell between an outer support frame and a mandrel and tilting the container in various directions in order to let the still liquid thermal insulation foam flow in the respective desired direction. The support of the room wall and the external wall effectively prevents their deformation. The core additionally performs the function of a handling tool for the room wall. This makes attaching the room wall at the external wall before injecting the foam redundant.

Furthermore, DE 32 08 302 A1 proposes to used stacked sea containers for habitation purposes.

BRIEF SUMMARY OF THE INVENTION

Thus it is an object of the invention to improve thermal insulation of the habitation unit.

The object is achieved by A habitation block, including habitation levels that are arranged on top of each other, wherein at least one of the habitation levels includes adjacent habitation units including an outer shell formed from a cuboid container that includes a placement surface, a cover, up to two lateral walls and up to two face walls, a cuboid interior space which has an edge length of at least 2 m respectively, a walkable base with step soundproofing, a room ceiling, and up to four room walls, wherein the up to four room walls are dry walls with an intermediary space formed between the cover and the up to four lateral walls and between the room ceiling and the up to four room walls, and a monolithic thermal insulation in the intermediary space, wherein the thermal insulation fills the intermediary space completely and is glued together with the room ceiling and with the up to four room walls so that the thermal insulation forms a substructure that stabilizes the dry walls The object is also achieved by a method for producing a thermal insulation between a room wall of a cuboid interior space and an exterior wall that is parallel to the room wall, wherein the interior space has an edge length of at least 2 m respectively and the exterior wall is configured at a cuboid container which envelopes the interior space, the method including the steps: initially attaching an interior surface of the room wall that is oriented towards the interior space at a core and positioning the interior surface together with the core parallel to the exterior wall before injecting a foam, supporting an exterior surface of the exterior wall that is oriented towards an exterior ambient of the container by a support device perpendicular to the interior surface, thereafter injecting a curing foam between the room wall and the exterior wall, and after curing the foam removing the core from the interior surface and removing the support device from the exterior surface, wherein the room wall is a dry wall which is attached at the core by a vacuum, and wherein the thermal insulation replaces a substructure that stabilizes the dry wall.

The step soundproofing decouples the base mechanically from the placement surface of the outer shell and thus prevents a transmission of walking sounds to adjacent, in particular lower habitation units.

Improving upon the known habitation block, it is proposed according to the invention that the thermal insulation completely fills the intermediary space and is glued together with the room walls. The gluing replaces the substructure for supporting the dry walls which is performed in classic drywall construction by wooden supports or metal profiles, and attaches the room ceilings and the room walls at the substructure by form locking and friction locking connectors like bolts or nails. In particular, the thermal insulation can be injected into the intermediary space, wherein the thermal insulation is glued together full surface with the room ceiling and the room walls, or the room ceiling and the room walls can be glued subsequently onto the thermal insulation. Also mixed embodiments are conceivable.

Advantageously the thermal insulation of a habitation block according to the invention is made in particular from a closed pore polyurethane hard foam. The thermal insulation then contributes to a mechanical stability of the room ceiling and the room wall.

Alternatively the thermal insulation can essentially be made from a pouring or a pourable material, e.g. wood fibers, expanded glass, Perlite or an amorphous silica aerogel with a foaming and hardening or fixing component.

The thermal insulation can also be put together in layer from a combination of the recited materials.

The thermal insulation can additionally include at least one layer made from a vacuum insulation panel (VIP panel). The thermal insulation then has a particularly high insulation value.

Advantageously the room walls and/or the room ceiling in a habitation block according to the invention include at least one layer made from an elastic material, in particular an open pore elastomeric foam or a mineral wool in plate form. The elastic material prevents a transmission of body sound between the shell and the interior cavity.

Advantageously the room walls, the floor and the room ceiling of the habitation unit in a habitation block according to the invention have a minerally bonded cover layer on an inside that is oriented towards the inner cavity. A minerally bonded cover layer, in particular from dry wall, cardboard or fiber plates facilitates furnishing the interior space with well-known affordable technologies. Alternatively the base, the room walls and the room ceiling can also be configured from a wood material, e.g. from three layer plates. Also mixed forms are conceivable.

In particular the base of the habitation unit according to the invention can include a dry screed. When the dry screed has a surface area weight of at least 50 kg/m$^2$ it simultaneously functions as a thermal buffer and thus reduces the thermal requirements of the habitation unit.

In a habitation block according to the invention the room walls, the floor and the room ceiling of the habitation unit can include a vapor barrier layer on an outside that is oriented towards the thermal insulation. The vapor barrier significantly reduces moisture absorption of the thermal insulation, in particular of a hydroscopic polyurethane hard foam through the room wall and thus retains the insulating properties of the thermal insulation.

Advantageously the floor of the habitation unit in the habitation block according to the invention includes a floor heating. The floor heating avoids additional heat radiators and provides a particularly high level of habitation comfort. Alternatively also the room walls or the room ceilings can be configured as heating surfaces. Also mixed forms are conceivable.

Advantageously the shell of the habitation unit n the habitation block according to the invention is an sea container. In particular used sea containers are available in large and increasing numbers as an economical raw material and are characterized by a very robust, in particular very weather resistant surface and can be reintroduced into the material cycle even after a secondary use of many years providing a valuable raw material.

Further advantageously the shell of the habitation unit in a habitation block according to the invention has a length of approximately 12 m and a height of approximately 2.9 m. A 40 ft. container of this type (so called high cube or HC container) facilitates a usable habitation surface of up to 26 square meters. Alternatively sea container with a length of 20 feet can be used for smaller habitation units and for larger units containers with a length of 45' or 53' can be used or with a height of approximately 2.6 meters for a complex floor and ceiling configuration of the habitation area.

Advantageously the outer shell and the room walls of the habitation unit in a habitation block according to the invention are interrupted by a door opening and/or window opening so that the inner space is connected with an outer environment of the shell. Alternatively a habitation unit according to the invention can also be accessed by stairs or by an elevator from below through the placement surface or from above through the cover. Also mixed forms are conceivable.

In a habitation block according to the invention the thermal insulation of the habitation unit as a matter of principle does not fill the door or window openings nor openings in the outer shell for stairs, elevators and discharge and supply conduits. In the context of this application these openings are not designated as part of the outer shell and the volumes connecting thereto in inward direction are not designated as part of the intermediary space.

Advantageously the outer shell of the habitation unit in a habitation block according to the invention includes a pass through that extends at a face side parallel to the face side and the interior space is separated from the pass through by a divider wall. Integrating the pass through into the outer shell simplifies combining several of the habitation units. Alternatively or additionally a habitation unit of this type can include an outward open terrace or a balcony at the same face side or at an opposite face side.

Advantageously the interior spaces of the adjacent habitation units in a habitation level of the habitation block according to the invention are connected with each other through the interrupted shells and room walls. Connected rooms are created by combining the habitation units, wherein a habitation surface of the connected rooms exceeds the space provided in a single container.

Advantageously the pass through openings of adjacent habitation units adjoin each other in a habitation level of this type and form a common alley way.

Further advantageously hallways of habitation levels that are arranged on top of each other in a habitation block according to the invention are connected by stair cases and/or elevators. Habitation units according to the invention that are arranged adjacent to each other and above each other can also be accessed by an independent accessory structure. Also mixed configurations are conceivable.

Improving upon the known method it is proposed according to the invention that the room wall is attached to the core by vacuum. The attachment of plate shaped building elements by vacuum at handling devices is well known from handling of OSB, three layer and particle boards in carpentry applications. After injecting and curing the foam the room wall is disengaged from the core by removing the vacuum from the core.

Advantageously the foam is injected according to the invention in layers that extend vertically on top of each other. According to the method according to the invention the foam fills uneven spots in the surface of the respective lower layer and levels them under the effect of gravity after the injection. Alternatively the foam is injected simultaneously from plural horizontally adjacent nozzles according to the method according to the invention wherein the nozzles move back and forth in the longitudinal direction of the room wall during the injection and are thus raised continuously.

Advantageously the foam is injected simultaneously between a second room wall and a second exterior wall according to the method according to the invention, wherein the room wall is arranged in the interior space opposite to the second room wall and the exterior wall is configured at the container opposite to the second room wall. Thus, the core and the support device are supported relative to each other during injection of the foam. Thus, the method according to the invention makes an external support as well as a support of the core or of the support device redundant.

Advantageously the foam according to the method according to the invention is injected after producing the thermal insulation between the room wall and the outer wall between a room ceiling that terminates the room in upward direction and a cover that terminates the container in upward direction. The method according to the invention thus also facilitates a thermal insulation of the room ceiling.

Advantageously injecting foam between the room wall and the exterior wall is documented according to the method according to the invention by a camera. Thus, the method according to the invention is documented for quality control of the thermal insulation.

Advantageously a method according to the invention is used when producing a habitation unit for the habitation block described supra. The method according to the invention facilitates an industrial fabrication of a habitation unit with high dimensional precision which significantly simplifies interior construction of the habitation unit.

BRIEF DESCRIPTION OF THE DRAWINGS

The invention is subsequently described based on an embodiment with reference to a drawing FIGURE.

DETAILED DESCRIPTION OF THE INVENTION

Figure 1:
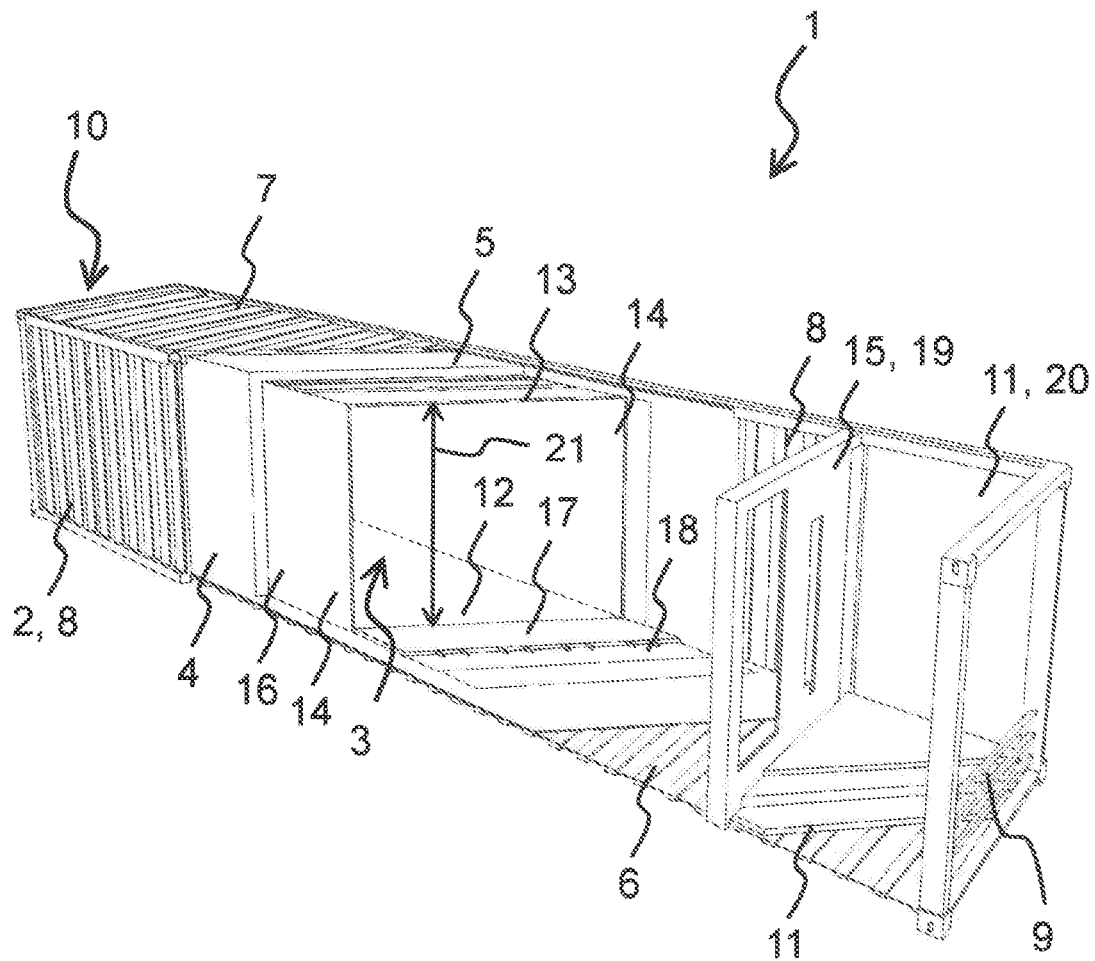
FIG. 1 illustrates a habitation block according to the invention.
Figure 2A:
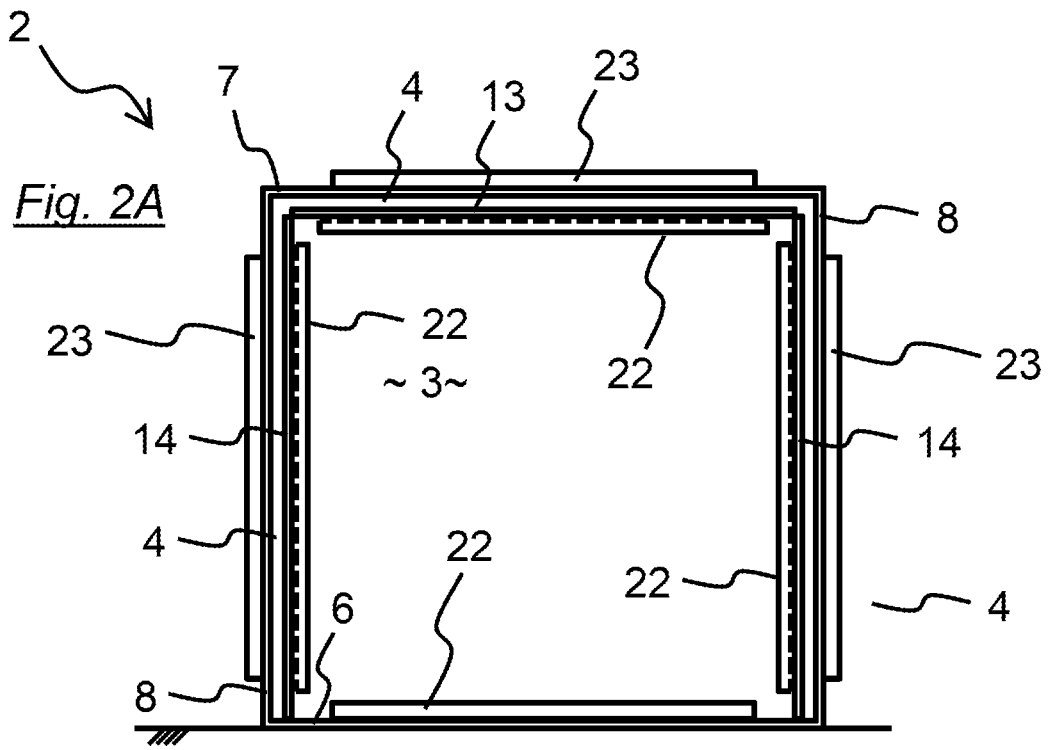
FIG. 2A illustrates the habitation block of FIG. 1 in a sectional view with the support device and the core applied.
Figure 2B:
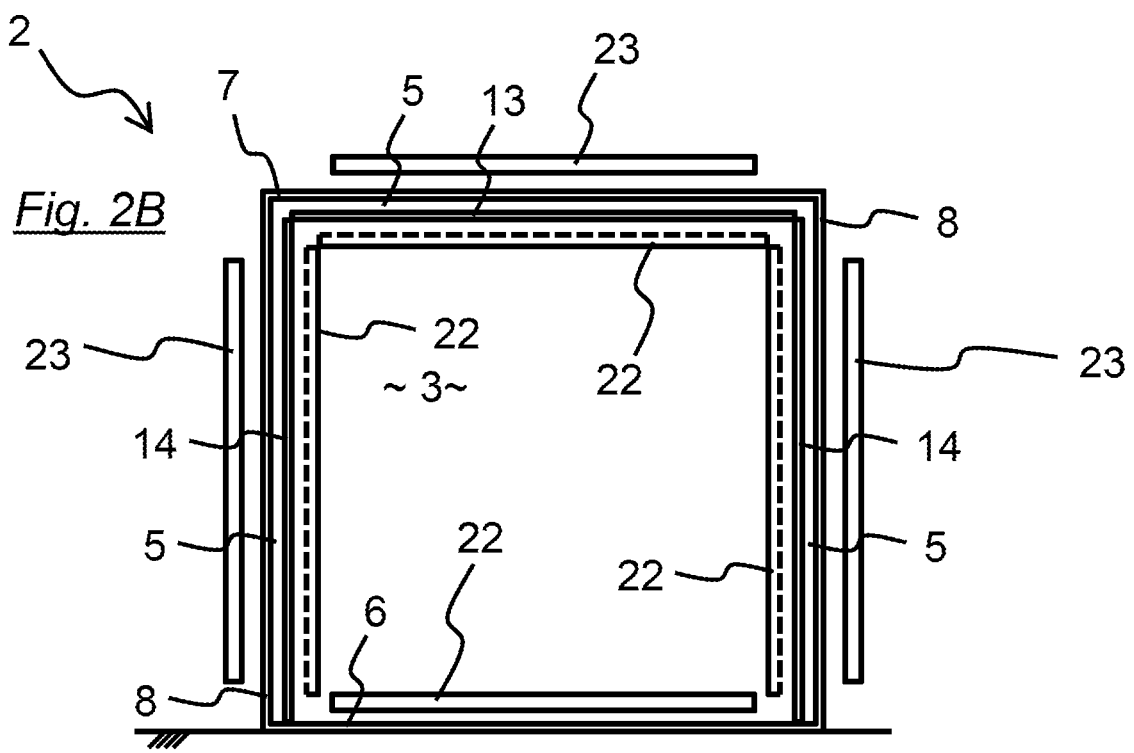
FIG. 2B illustrates the habitation block according to FIG. 1 in a sectional view with the support device and the core disengaged.

The first habitation unit 1 according to the invention illustrated in the drawing figure includes an outer shell 2 made from a 40' HC sea container and a cuboid interior space 3 and an interior space 4 with thermal insulation 5 between the shell 2 and the interior space 3.

The outer shell 2 includes a horizontally extending placement surface 6 and there above and parallel to the placement surface 6, a cover 7, two side walls 8 and two face walls 9, 10. The side walls 8 are interrupted by two door openings 11 and the front face wall 9 is provided as a fall safety. The interior space 3 includes a walkable floor 12 and there above in parallel to the floor 12 a room ceiling 13 and four vertical room walls 14, 15.

The room walls 14, 15, the floor 12 and the room ceiling 13 respectively include gypsum fiber plates as a minerally bonded cover layer which is defined towards the thermal insulation 5 by a pressure resistant vapor barrier 16 made from aluminum.

In order to produce the habitation unit 1 the room walls 14, 15 and the room ceiling 13 are attached by vacuum at a core 22 and inserted with the core 22 into the previously emptied shell 2. The shell 2 is clamped from an outside in a support device 23.

Then a polyurethane hard foam is injected for the thermal insulation 5 with a pressure above 200 bar by two spraying devices that are not illustrated wherein the injecting is initially performed simultaneously between two room walls 14, 15 and the shell 2 in layers that extend vertically above one another and subsequently the insulation is injected in adjacent layers between the room ceiling 13 and the shell 2.

After curing the thermal insulation 5 the vacuum is removed, the core is 22 separated from the from the room walls 14, 15 and room ceiling 13. The room walls 14, 15 are moved towards each other, the core 22 is removed from the interior space 3 and the clamping in the support device 23 is disengaged.

After installation of the floor 12 with a plate shaped prefabricated thermal insulation, walking noise insulation and floor heating 18 the habitation unit is ready for interior finishing.

The interior space 4 is phoned with a monolithic thermal insulation 5 made from polyurethane hard foam between the cover 7 and the room ceiling 13 and between the side walls 8 and the rear face wall 10 and the room walls 14 and is thus completely filled without any gaps. The thermal insulation 5 is glued with its entire surface with the room ceiling 13 and with the room walls 14 as well as with the shell 2 and furthermore envelops the front room wall 15 of the inner space 3 wherein the front room wall 15 simultaneously forms a divider wall 19 to a pass through 20 between the two door openings 11 that is integrated into the habitation unit 1.

The interior space 3 of the habitation unit 1 according to the invention has a useable habitation surface of 9.5 m×2.2 m=20.9 m$^2$, with a room height 21 of 2.4 m. The habitation unit 1 according to the invention has excellent sound insulation properties, complies with the passive house energy standard and is recyclable to a large extent. Several habitation units 1 can be arranged adjacent to each other so that the door openings 11' of adjacent habitation units match and the pass through alleys 20 form a common covered walking alley.

A second, third, fourth and fifth habitation unit that is produced according to the invention is not illustrated but substantially corresponds to the first habitation unit 1. The second habitation unit does not have a pass through for a walking alley but a useable habitation surface of 12 meters× 2.2 meters=26.4 m$^2$. The third habitation unit is provided for installation in a stack of habitation units produced according to the invention and has no thermal insulation between the placement surface and the floor and between the cover and the room ceiling.

The fourth and fifth habitation unit do not have a vapor barrier but an elastic layer made from mineral wool that is connected with the gypsum fiber plate and sound decouples the interior space from the shell and thus from the environment or adjacent habitation units. In the fourth habitation unit the polyurethane hard foam is directly adjacent to the mineral wool, the fifth habitation unit includes a prefabricated double gypsum fiber plate with an intermediary layer made from the mineral wool which simplifies handling.

REFERENCE NUMERALS AND DESIGNATIONS 1 habitation unit
2 outer shell
3 interior space 4 intermediary space
5 thermal insulation
6 placement surface
7 cover
8 wall
9 front face wall
10 rear face wall
11 door opening
12 walkable floor
13 room ceiling
14 room wall
15 front room wall
16 vapor barrier
17 walking sound insulation
18 floor heating
19 divider wall
20 pass through opening
21 room height
22 core
23 support device

What is claimed is:

1. A method for producing a thermal insulation between a dry wall room wall of a cuboid interior space and an exterior wall that is parallel to the room wall,
wherein the cuboid interior space has an edge length of at least 2 m respectively and the exterior wall is configured at the cuboid container which envelopes the interior space, the method comprising the steps:
initially attaching an interior surface of the dry wall room wall that is oriented towards the interior space at a core by a vacuum and positioning the interior surface together with the core parallel to the exterior wall before injecting a curing foam,
supporting an exterior surface of the exterior wall that is oriented towards an exterior ambient of the container by a support device perpendicular to the interior surface,
thereafter injecting the curing foam between the dry wall room wall and the exterior wall while the dry wall room wall is attached at the core by the vacuum and while the exterior surface of the exterior wall is supported by the support device, and
after curing the foam removing the core from the interior surface and removing the support device from the exterior surface, and
wherein the thermal insulation forms a substructure that stabilizes the dry wall.

2. The method according to claim 1, wherein the foam is injected in layers that are arranged vertically on top of each other.

3. The method according to claim 1,
wherein the foam is simultaneously injected between a second dry wall room wall and a second exterior wall, and
wherein the room wall is arranged in the interior space opposite to the second dry wall room wall and the exterior wall is configured at the container opposite to the second exterior wall.

4. The method according to claim 1, further comprising the step: subsequently injecting the foam between a room ceiling that terminates the room in upward direction and a cover that terminates the container in the upward direction.

5. The method according to claim 1, wherein injecting the foam between the room wall and the exterior wall is documented by a camera.

* * * * *